US010663084B2

(12) United States Patent
Markie et al.

(10) Patent No.: US 10,663,084 B2
(45) Date of Patent: May 26, 2020

(54) NOISE-DAMPENING PRESSURE RELIEF VALVE

(71) Applicant: Illinois Tool Works Inc., Glenview, IL (US)

(72) Inventors: Michael Raymond Markie, Roseville, MI (US); John Elmer Carey, Ortonville, MI (US)

(73) Assignee: Illinois Tool Works Inc., Glenview, IL (US)

( * ) Notice: Subject to any disclaimer, the term of this patent is extended or adjusted under 35 U.S.C. 154(b) by 94 days.

(21) Appl. No.: 15/810,221

(22) Filed: Nov. 13, 2017

(65) Prior Publication Data

US 2018/0156355 A1    Jun. 7, 2018

Related U.S. Application Data

(60) Provisional application No. 62/430,392, filed on Dec. 6, 2016.

(51) Int. Cl.
*F16K 15/16*    (2006.01)
*F16K 15/14*    (2006.01)
(Continued)

(52) U.S. Cl.
CPC ............. *F16K 47/08* (2013.01); *B60H 1/249* (2013.01); *F16K 15/144* (2013.01); *F16K 15/16* (2013.01);
(Continued)

(58) Field of Classification Search
CPC ....... B60H 1/249; B60H 1/248; F16K 15/031; F16K 15/035; F16K 15/14; F16K 15/144; F16K 15/16; F16K 17/044; F16K 17/0466; F16K 17/02; F16K 17/0433; F16K 17/0446; F16K 17/0453; F16K 24/04; F16K 31/126; F16K 31/1266; F16K 31/1268; F16K 47/00; F16K 47/08; F16K 15/036; F16K 15/038; F16K 15/148; F16K 27/0209; F16K 27/0227; F16K 27/0218; F16K 15/202; F16K 17/025; F16K 17/28;
(Continued)

(56) References Cited

U.S. PATENT DOCUMENTS 4,567,816 A * 2/1986 Kolt .................... F24F 13/1426
                                                          137/512.15
5,105,849 A    4/1992 Clough
(Continued)

FOREIGN PATENT DOCUMENTS

EP    0692397 A1 *  1/1996  ......... B60H 1/00678
EP    1818197 A1 *  8/2007  ............. B60H 1/249
(Continued)

*Primary Examiner* — Hailey K. Do
(74) *Attorney, Agent, or Firm* — Quarles & Brady LLP

(57) ABSTRACT

A pressure relief valve includes a housing including an air passage chamber defining an airflow passage and a membrane flap secured within the air passage chamber. The membrane flap covers the airflow passage in a closed position. A portion of the membrane flap is configured to move off the airflow passage into an open position. A flap motion dampener is proximate to the airflow passage. The flap motion dampener is configured to control motion of the membrane flap as the membrane flap seats over the airflow passage in order to dampen noise.

18 Claims, 3 Drawing Sheets

(51) Int. Cl.
  *B60H 1/24* (2006.01)
  *F16K 47/08* (2006.01)
  *F16K 24/04* (2006.01)
  *F16K 31/126* (2006.01)
  *F16K 15/03* (2006.01)

(52) U.S. Cl.
  CPC ............ *F16K 15/031* (2013.01); *F16K 24/04* (2013.01); *F16K 31/126* (2013.01)

(58) Field of Classification Search
  CPC .. F16K 39/02; F16K 39/028; Y10T 137/7891; Y10T 137/784; Y10T 137/7839; Y10T 137/7843; Y10T 137/7727
  See application file for complete search history.

(56) References Cited

U.S. PATENT DOCUMENTS

| | | | |
|---|---|---|---|
| 5,228,468 A * | 7/1993 | Kapadia | F04B 53/105 137/1 |
| 5,727,999 A | 3/1998 | Lewis | |
| 5,759,097 A | 6/1998 | Bernoville | |
| 5,904,618 A | 5/1999 | Lewis | |
| 6,357,473 B1 * | 3/2002 | Porter | B60H 1/249 137/512.15 |
| 8,439,035 B2 * | 5/2013 | Dantanarayana | A61B 5/0876 128/205.24 |
| 8,485,872 B2 * | 7/2013 | Valencia, Jr. | B60H 1/249 123/73 AV |
| 2004/0231737 A1 * | 11/2004 | Kim | F04B 39/1073 137/857 |
| 2008/0268763 A1 * | 10/2008 | Dippel | B60H 1/249 454/152 |
| 2010/0243083 A1 * | 9/2010 | Shereyk | B60H 1/249 137/527 |
| 2017/0282688 A1 * | 10/2017 | Mohany | B60H 1/249 |
| 2017/0326948 A1 * | 11/2017 | Huet | B60H 1/249 |
| 2019/0054803 A1 * | 2/2019 | Carlson | B60H 1/249 |

FOREIGN PATENT DOCUMENTS

| | | |
|---|---|---|
| EP | 1985480 | 10/2008 |
| EP | 2050600 | 4/2009 |

\* cited by examiner

NOISE-DAMPENING PRESSURE RELIEF VALVE

RELATED APPLICATIONS

This application relates to and claims priority benefits from U.S. Provisional Patent Application No. 62/430,392, entitled "Pressure Relief Assembly Having Flap Noise-Dampening Member," filed Dec. 6, 2016, which is hereby incorporated by reference in its entirety.

FIELD OF EMBODIMENTS OF THE DISCLOSURE

Embodiments of the present disclosure generally relate to a venting or pressure relief device configured for use in an enclosed area, such as an automobile, and more particularly to systems and methods for reducing noise that may be generated by a pressure relief assembly.

BACKGROUND

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications.

A conventional pressure relief device includes a plastic housing having a plurality of air passages. A light membrane (for example, a flap) is positioned over the air passages, and is configured to allow air to pass in one direction. In order to allow air to pass, the light membrane opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, a user presses on the four corners of the pressure relief device in order to secure it within a reciprocal hole in a structure, such as a frame or sheet within a vehicle.

Pressure relief valves are shown and described in, for example, EP 2050600, U.S. Pat. Nos. 5,105,849, 5,759,097, 5,727,999, 5,904,618, and EP 1985480.

Many known pressure relief valves generate noise when membrane flaps return to their at-rest positions within air passage chambers of housings. For example, as the membrane flaps move back to at-rest positions and abut into a rim or lip surrounding an air passage(s), the contact therebetween may generate undesirable noise. Typically, the rim or lip surrounding the air passage(s) is formed of a hard plastic, along with the rest of the housing. As such, when the membrane flap returns to a hard stop on the rim, a noticeable sound may be generated. In order to reduce such noise, some known pressure relief valves include felt flaps. However, such flaps may not provide desired response to exerted air pressure, as they may be heavier and/or less flexible than typical membrane flaps, for example.

SUMMARY OF EMBODIMENTS OF THE DISCLOSURE

A need exists for a pressure relief assembly that eliminates, minimizes or otherwise reduces undesired noise that may be generated by membrane flap motion.

With that need in mind, certain embodiments of the present disclosure provide a pressure relief valve that includes a housing including an air passage chamber defining an airflow passage, and a membrane flap secured within the air passage chamber. The membrane flap covers the airflow passage in a closed position. A portion of the membrane flap is configured to move off the airflow passage into an open position. A flap motion dampener is proximate to the airflow passage. The flap motion dampener is configured to control motion of the membrane flap as the membrane flap seats over the airflow passage in order to dampen noise.

The housing may include a first air passage beam and a second air passage beam. The air airflow passage may be defined at least in part between the first air passage beam and the second air passage beam. The flap motion dampener may connect to the first air passage beam and the second air passage beam.

In at least one embodiment, the flap motion dampener spans across the airflow passage.

In at least one embodiment, the flap motion dampener includes a cross rib having a first end that connects to a second end through a main body. The cross rib extends outwardly away from the first and second ends towards and into a crown at a mid-section of the main body. The crown is disposed in front of the airflow passage. The crown includes a flattened front surface.

In at least one embodiment, the first end connects to a first air passage beam, and the second end connects to a second air passage beam. The first air passage beam may be parallel to the second air passage beam, and the cross rib may be perpendicular to the first air passage beam and the second air passage beam.

The flap motion dampener may be integrally molded with the housing.

A portion of the flap motion dampener may be disposed within the airflow passage. Optionally, the flap motion dampener may be disposed in front of the airflow passage towards the membrane flap.

The flap motion dampener may have a portion that is proximate to a center of the airflow passage.

Figure 1:
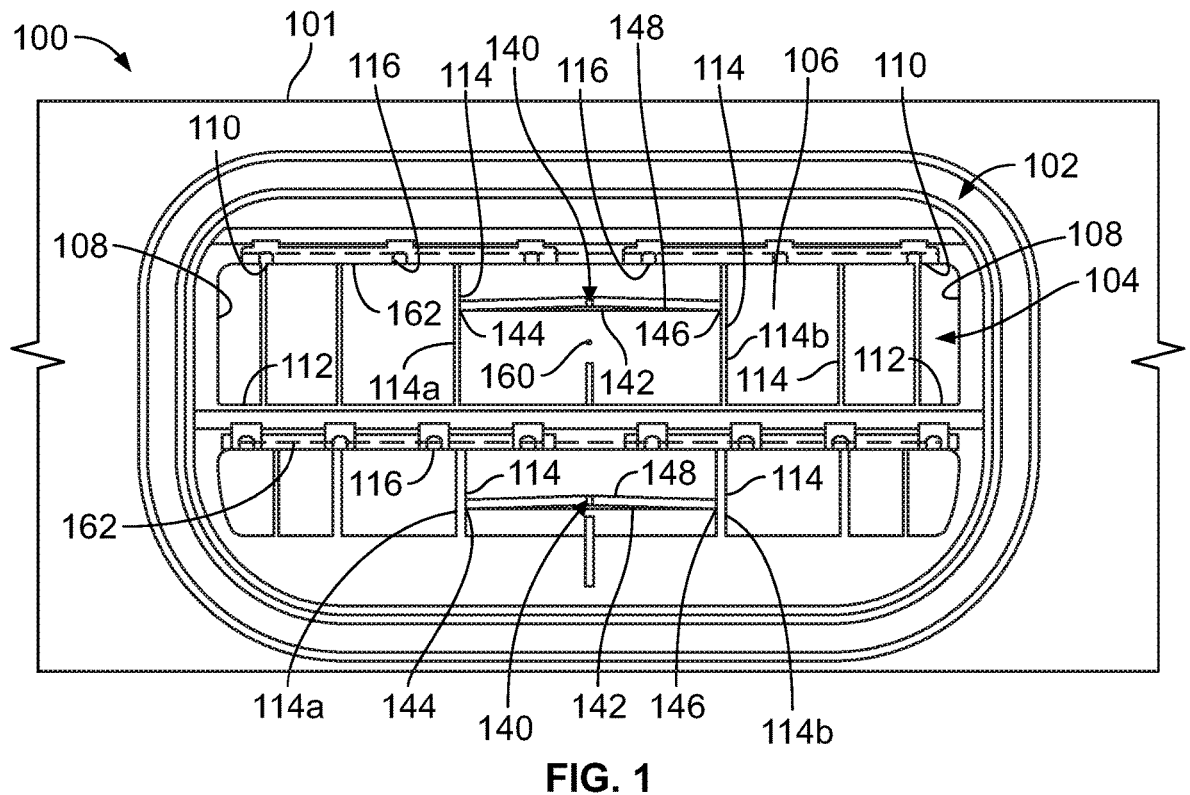
FIG. 1 illustrates a front view of a pressure relief valve or assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a pressure relief valve/assembly that includes a main housing defining one or more air passages. Flaps are mounted over the air passages.

The pressure relief valve includes at least one flap motion dampener that is configured to dampen noise that would otherwise be caused by flap contact with a portion of a housing of the pressure relief valve. In at least one embodiment, the flap motion dampener is integrally molded with the housing. The flap motion dampener dampens flap noise when the flap contacts the flap motion dampener, which may span cross-wise across an airflow passage defined within the housing. The flap motion dampener may connect to the housing through a thin web of material, such as a portion of the housing. The flap motion dampener dampens flap motion and noise, while allowing the flap to move to complete closure.

The flap motion dampener is positioned within the housing and absorbs at least a portion of the return force of the flap as the flap returns to a sealing position on the housing. The flap motion dampener effectively dampens flap motion and noise, while the housing maintains an effective sealing surface with respect to the flap (to prevent reverse air flow).

The pressure relief valve may include one or more flap motion dampeners that span across one or more air passages between beams. The flap motion dampener(s) may extend upwardly from lateral portions that connect to the beams to a crown or apex at a mid-point. The apex or crown contacts the flap before the flap contacts edge portions around the air passage, thereby controlling flap return motion, and dampening noise.

As described herein, embodiments of the present disclosure provide a pressure relief valve having at least one flap motion dampener (which may be or otherwise include a cross rib) that is configured to dampen undesired noise generated by a flap moving back over an air passage. The cross-wise flap motion dampener effectively dampens flap motion while allowing the flap to return to an effective sealing position over the air passage.

Figure 2:
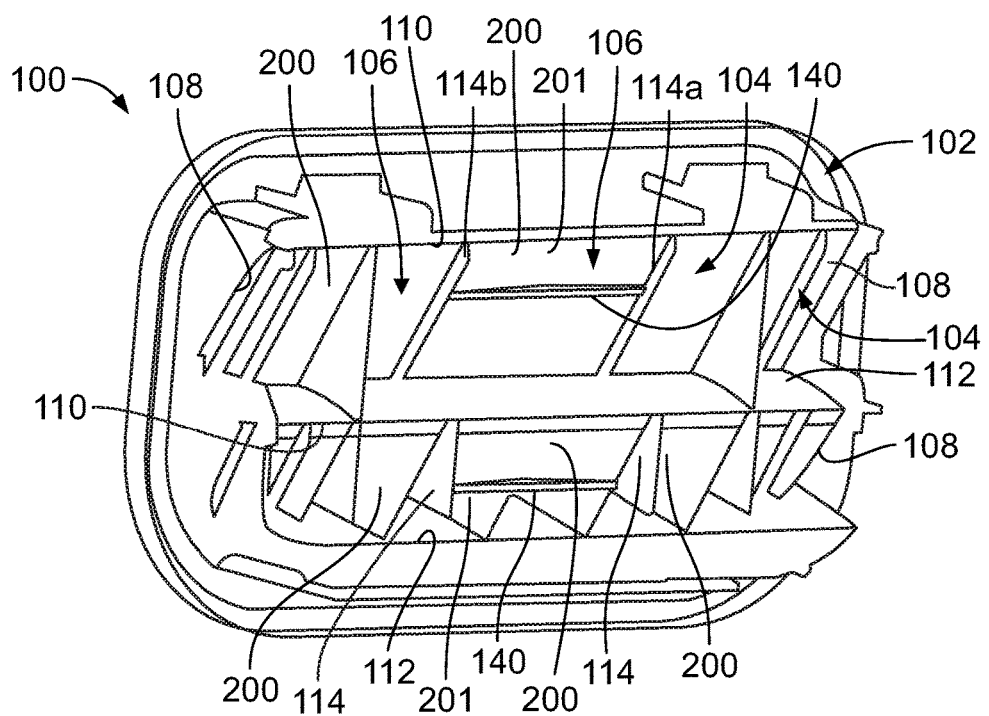
FIG. 2 illustrates a perspective rear view of a pressure relief valve or assembly, according to an embodiment of the present disclosure.

FIG. 1 illustrates a front view of a pressure relief assembly, device, or valve 100, according to an embodiment of the present disclosure. FIG. 2 illustrates a perspective rear view of the pressure relief valve 100. Referring to FIGS. 1 and 2, the pressure relief valve 100 is configured to secure to a component 101, such as a panel of sheet metal of a vehicle, for example. The pressure relief valve 100 secures into an opening formed through the panel 101. For example, the pressure relief valve 100 may snapably secure into the opening formed through the panel 101.

The pressure relief valve 100 includes a frame or housing 102 that includes a plurality of air passage chambers 104 that define airflow openings or passages 106. Flaps 200 secure in the air passage chambers 104 over the airflow passages 106. The pressure relief assembly 100 may include more or less air passage chambers 104 and flaps 200 than indicated in FIGS. 1 and 2.

Each air passage chamber 106 includes lateral walls 108 integrally connected to top and bottom walls 110 and 112, respectively. An air passage wall or beam 114 may extend between the lateral, top and bottom walls 108, 110, and 112, respectively. The airflow passages 106 are defined between the top and bottom walls 110, 112, the air passage beams 114, and the lateral walls 108. The lateral walls 108 may also be considered air passage beams. That is, the lateral walls 108 may be air passage beams. The air passage beams 114 may angle upwardly from the top wall 110 towards the bottom wall 112. The angle of the air passage beams 114 may vary based on a desired amount of flap resistive force.

The housing 102 may be formed of a hard plastic, such as acrylic. In at least one embodiment, the housing 102 is formed of injection-molded polypropylene. The housing 102 may be formed through a thermoforming process, which is generally an efficient and economical way of making various plastic devices. During the manufacturing process, a roll of plastic may be fed into a cavity, and then the plastic is formed using heat and pressure.

Instead of a plurality of air passage chambers 104, the housing 102 may include a single air passage chamber 104. Further, each air passage chamber 104 may define more or less airflow passages 106 than shown. For example, an air passage chamber 104 may define a single airflow passage 106. Also, optionally, the air passage beams 114 may be coplanar with a flat underside of the housing 102, instead of being angled.

In closed positions, the flaps 200 cover the airflow passages 106. Each flap 200 may be anchored to the housing 102 proximate to the top wall 110. For example, the flaps 200 may mount to the housing 102 through first attachments, such as connecting protuberances 116 outwardly extending above the airflow passages 106. Each flap 200 may be a flexible membrane having channels formed proximate to an upper edge. The connecting protuberances 116 may extend through the channels to secure the flaps 200 to the housing 102. The flaps 200 may be formed of a flexible thermoplastic elastomer, such as ethylene propylene diene monomer (EPDM) rubber, polypropylene, Hytrel, Lexan, Tyvac or Mylar, for example.

In at-rest positions, the flaps 200 cover the airflow passages 106. As air pressure builds and is exerted into undersides 201 of the flaps 200, the flaps 200 pivot or otherwise flap open so that the airflow passages 106 are exposed, thereby allowing air to vent through the pressure relief assembly 100.

A flap motion dampener 140 is configured to dampen noise that would otherwise be caused by a flap 200 contacting a portion of the housing 102, such as front surfaces of the top wall 110, the bottom wall 112, the lateral walls 108, and the air passage beams 114. As shown in FIGS. 1 and 2, the flap motion dampener 140 may be or otherwise include a cross-beam that spans between two air passage beams 114. A flap motion dampener 140 may span between an air passage beam 114 and a lateral wall 108. As shown in FIGS. 1 and 2, a flap motion dampener 140 may span across less than all of the airflow passages 106 of the pressure relief device 100. Optionally, the pressure relief device 100 may include more flap motion dampeners 140 than shown. For example, a flap motion dampener 140 may span across each airflow passage 106. Further, more than one flap motion dampener 140 may span across a single airflow passage 106.

In at least one embodiment, the flap motion dampener 140 includes a cross rib 142 having a first end 144 that connects to a second end 146 through a main body 148. The first end 144 connects to a first air passage beam 114a, while the second end 146 connects to a second air passage beam 114b. The first and second air passages beams 114a and 114b may be parallel to one another. An airflow passage 106 is defined between the air passages beams 114a and 114b, the top wall 110, and the bottom wall 112. The cross rib 142 may be perpendicular to the air passage beams 114a, 114b, and parallel with the top wall 110 and the bottom wall 112. Optionally, the cross rib 142 may not be perpendicular to the air passage beams 114a, 114b, and/or parallel to the wall 110 and the bottom wall 112.

In at least one embodiment, the flap motion dampener 140 is integrally molded with the housing 102. The flap motion dampener 140 may be formed of the same material as the housing 102. Optionally, the flap motion dampener 140 may be separately formed and secured to the housing 102. In at least one embodiment, the flap motion dampener 140 may be formed of rubber, a thermoplastic elastomer, a thermoplastic vulcanizate, a polyurethane foam, and/or the like.

As shown, the flap motion dampener 140 spans across the airflow passage 106. The flap motion dampener 140 may be at least partially within the airflow passage 106. In at least one other embodiment, the flap motion dampener 140 is disposed in front of the airflow passage 106 (towards a rear surface of a flap 200).

A portion of the flap motion dampener 140 (such as a central portion) may be disposed proximate to a center 160 of the airflow passage 106. In at least one embodiment, the flap motion dampener 140 is positioned above the center 160 towards the top wall 110. As such, the flap motion dampening member 140 may be shifted away from the center 160 towards (but not coaxial with) a pivot axis 162 of the flap 200, which may thereby provide increased control of flap motion. Optionally, the flap motion dampener 140 may be positioned at or below the center 160 towards the bottom wall 110.

In operation, the flap motion dampener 140 dampens motion and noise when the flap 200 contacts the flap motion dampener 140. The flap motion dampener 140 absorbs at least a portion of the return force of the flap 200 as the flap 200 returns to a sealing position over the airflow passage 106. The flap motion dampener 140 effectively dampens flap motion and noise, while the housing 102 maintains an effective sealing surface with respect to the flaps 200 (to prevent reverse air flow).

The flap motion dampener 140 may be flexible (for example, configured to deflect into and away from the airflow passage 106 and/or the air passage beams 114), thereby providing increased energy absorption in relation to the motion of the flap 200. As described herein, the flap motion dampener 140 may include the cross rib 142. Optionally, instead of a rib, the flap motion dampener 140 may be formed of or otherwise include a rod, a cylinder, webbing, a mesh, a screen, a fin, a coil, and/or the like.

Figure 3:
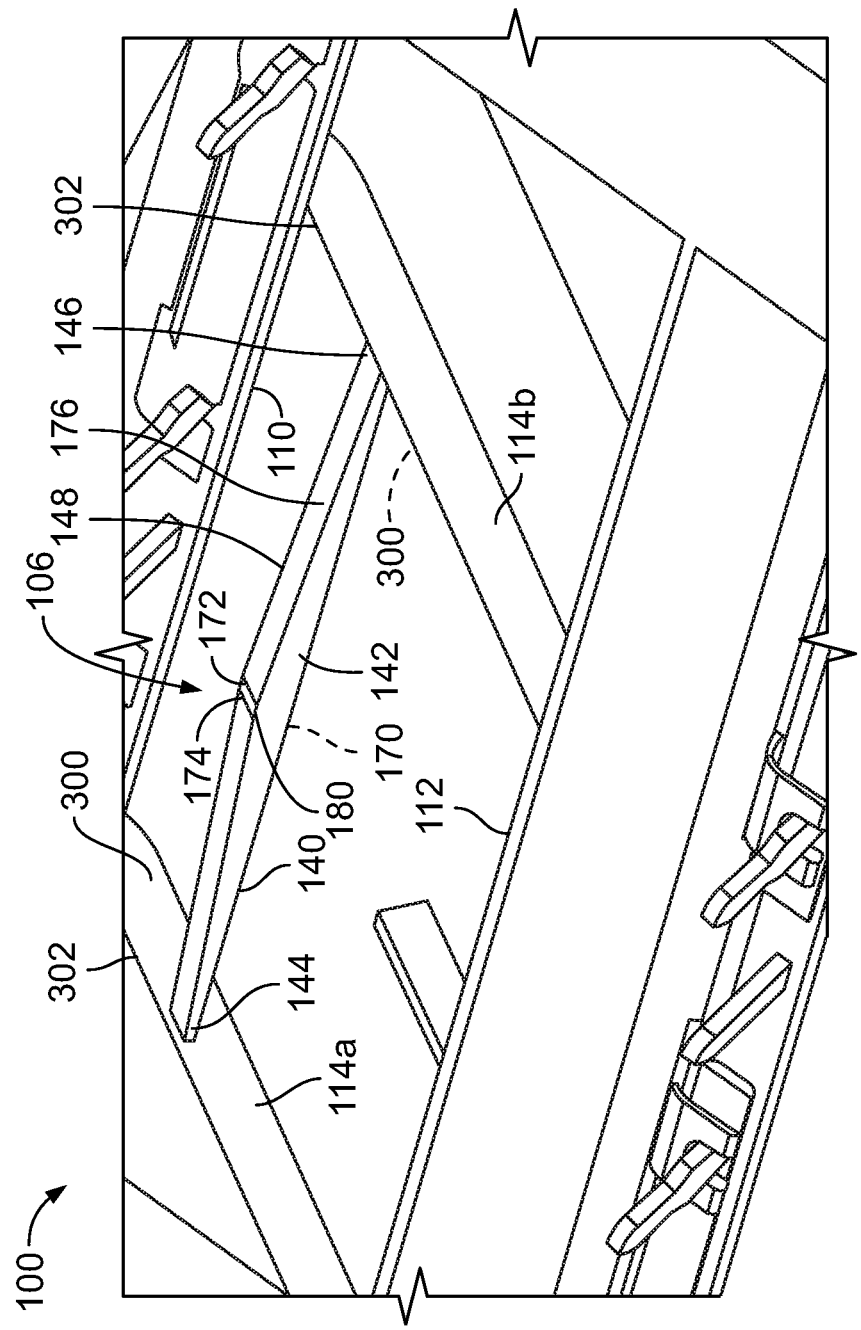
FIG. 3 illustrates a perspective front view of a flap motion dampener spanning between air passage beams of a pressure relieve valve or assembly, according to an embodiment of the present disclosure.

FIG. 3 illustrates a perspective front view of the flap motion dampener 140 spanning between the air passage beams 114a and 114b of the pressure relief valve 100. In at least one embodiment, the first end 144 and the second end 146 connect to interior surfaces 300 of the air passage beams 114a and 114b, thereby disposing a rear surface 170 of the main body 148 of the cross beam 142 within the airflow passage 106, which is defined between the air passage beams 114a, 114b, the top wall 110, and the bottom wall 112. Optionally, the first end 144 and the second end 146 may connect to front edges 302 of the air passage beams 114a and 114b so that the rear surface 170 of the main body 148 is disposed above the airflow passage 106.

As shown, the cross rib 142 extends outwardly away from the lower surface 170 from the lateral ends 144, 146 towards and into an apex or crown 172 at a mid-point or section 174. The crown 172 is disposed in front of the front edges 302 of the air passage beams 114a and 114b. As such, the crown 172 is disposed in front of the airflow passage 106.

The front surface 176 of the cross rib 142 angles outwardly from the ends 144 and 146 into an outermost ledge defined by the crown 172 at or about the mid-point or section 174. In at least one embodiment, the crown 172 includes a flattened front surface 180, instead of a distinct edge. That is, the crown 172 may be defined by a flattened length that defines a seating area for a lower surface of a flap. The length of the crown 172 between the air passage beams 114a and 114b may be shorter or longer than shown. The crown 172 is disposed in front of the airflow passage 106 so that a returning/seating flap first contacts the crown 172 before the front edges 302 of the air passage beams 114a and 114b.

Figure 4:
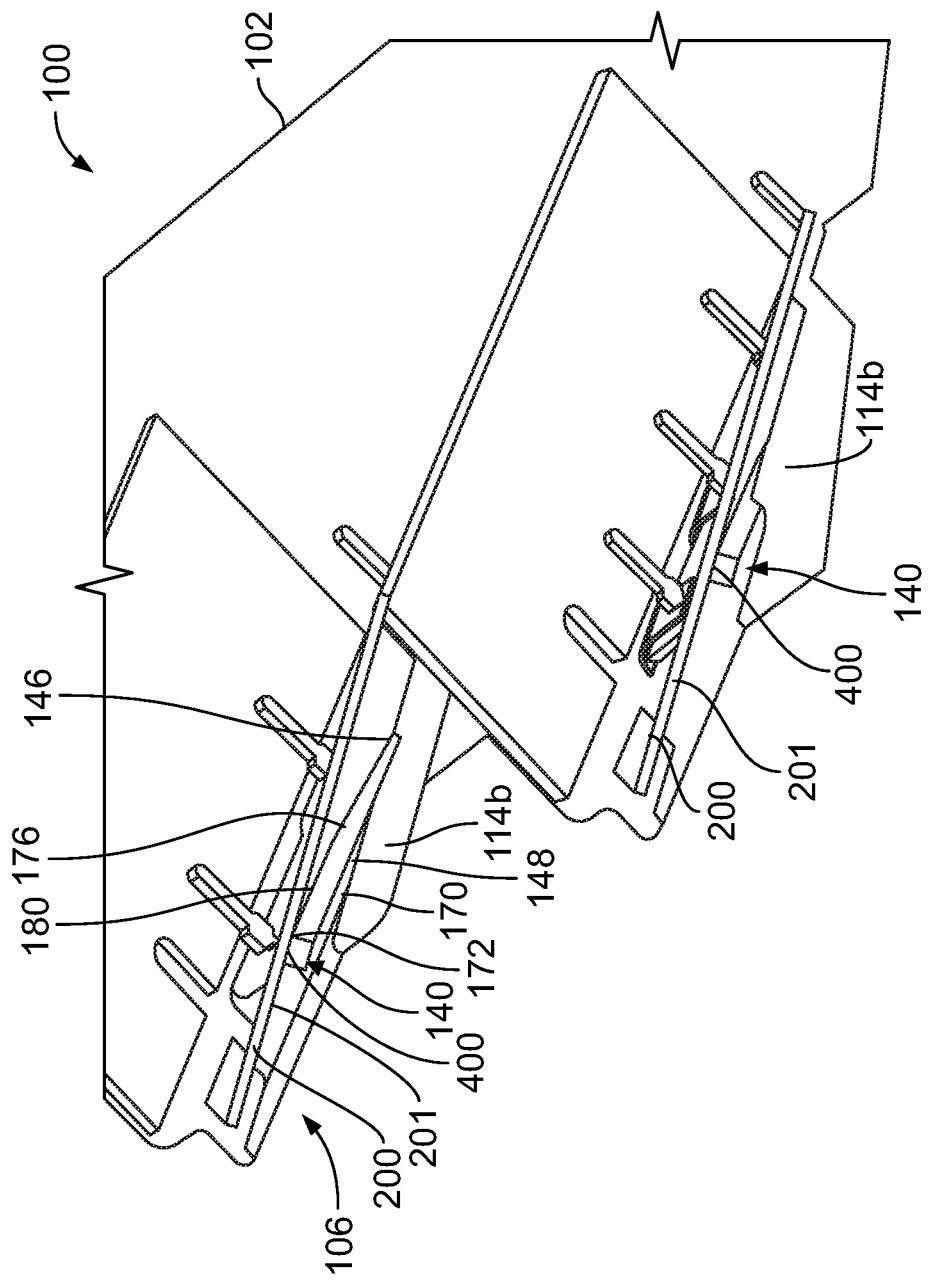
FIG. 4 illustrates a partial cross-sectional view of a pressure relief valve or assembly at a flap contact point, according to an embodiment of the present disclosure.

FIG. 4 illustrates a partial cross-sectional view of the pressure relief valve 100 at a flap contact point 400, according to an embodiment of the present disclosure. As shown, the crown 172 (such as the flattened front surface 180) contacts the underside 201 of the flap 200 before the flap 200 contacts peripheral front edge portions (such as the front edges 302 shown in FIG. 3) around the airflow passage 106. In this manner, the flap motion dampener 140 controls the return seating motion of the flap 200 over the airflow passage 106, thereby dampening motion and noise that would otherwise be caused by the flap 200 seating over the airflow passage 106. The flap motion dampener 140 slows the motion of the returning flap 200 through the outwardly-extending crown 172 contacting the underside 201 of the flap 200 before other portions of the flap 200 are able to contact the front edges 302. Referring to FIGS. 2 and 4, in the closed position, the flaps 200 seat over the flap motion dampener 140 and the air passage beams 114a and 114b.

As described herein, embodiments of the present disclosure provide a pressure relief valve having at least one flap motion dampener that is configured to dampen undesired noise generated by a flap moving back over an air passage. The flap motion dampener effectively dampens flap motion while allowing the flap to return to an effective sealing position over the air passage.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A pressure relief valve comprising:
   a housing including an air passage chamber defining an airflow passage, wherein the airflow passage is defined between a first air passage beam and a second air passage beam, wherein the first and second air passage beams extend at least partially through the air passage chamber;
   a membrane flap secured within the air passage chamber, wherein the membrane flap covers the airflow passage in a closed position, and wherein a portion of the membrane flap is configured to move off the airflow passage into an open position; and
   a flap motion dampener proximate to the airflow passage and adjoining the first air passage beam and the second air passage beam and extending at least partially through the air passage chamber, at least a portion of the flap motion dampener extending outwardly beyond edges of the first and second air passage beams, wherein the flap motion dampener is configured to engage the membrane flap before the membrane flap engages the first and second air passage beams when the membrane flap moves toward the closed position in order to dampen noise.

2. The pressure relief valve of claim 1, wherein the flap motion dampener connects to the first air passage beam and the second air passage beam.

3. The pressure relief valve of claim 1, wherein the flap motion dampener spans across the airflow passage.

4. The pressure relief valve of claim 1, wherein the flap motion dampener is integrally molded with the housing.

5. The pressure relief valve of claim 1, wherein a portion of the flap motion dampener is disposed within the airflow passage.

6. The pressure relief valve of claim 1, wherein the flap motion dampener has a portion proximate to a center of the airflow passage.

7. The pressure relief valve of claim 1, wherein the flap motion dampener comprises a cross rib having a first end that connects to a second end through a main body.

8. The pressure relief valve of claim 7, wherein the first air passage beam is parallel to the second air passage beam, and wherein the cross rib is perpendicular to the first air passage beam and the second air passage beam.

9. The pressure relief valve of claim 7, wherein the cross rib extends outwardly away from the first and second ends towards and into a crown at a mid-section of the main body, wherein the crown extends past the edges of the first and second air passage beams.

10. The pressure relief valve of claim 9, wherein the crown includes a flattened surface.

11. A pressure relief valve comprising:
    a housing including an air passage chamber defining a plurality of airflow passages, wherein the air passage chamber includes a top wall, a bottom wall, and a plurality of air passage beams extending at least partially through the air passage chamber, wherein the plurality of airflow passages are defined between the top wall, the bottom wall, and the plurality of airflow passage beams;
    at least one membrane flap secured within the air passage chamber, wherein the at least one membrane flap covers the plurality of airflow passages in a closed position, and wherein a portion of the at least one membrane flap is configured to move off the plurality of airflow passages into an open position; and
    a plurality of flap motion dampeners each adjoining a corresponding pair of the plurality of airflow passage beams and extending at least partially through the air passage chamber, at least a portion of at least one of the plurality of flap motion dampeners extending outwardly beyond edges of the corresponding pair of the plurality of airflow passage beams, wherein the plurality of flap motion dampeners are configured to engage the at least one membrane flap before the at least one membrane flap engages the plurality of airflow passage beams when the at least one membrane flap moves toward the closed position in order to dampen noise.

12. The pressure relief valve of claim 11, wherein at least one of the plurality of flap motion dampeners comprises a cross rib having a first end that connects to a second end through a main body.

13. The pressure relief valve of claim 12, wherein the cross rib extends outwardly away from the first and second ends towards and into a crown at a mid-section of the main body, wherein the crown extends past the edges of the corresponding pair of the plurality of airflow passage beams.

14. The pressure relief valve of claim 13, wherein the crown includes a flattened surface.

15. The pressure relief valve of claim 12, wherein the first end of the cross rib connects to a first air passage beam, and wherein the second end of the cross rib connects to a second air passage beam.

16. The pressure relief valve of claim 15, wherein the first air passage beam is parallel to the second air passage beam, and wherein the cross rib is perpendicular to the first air passage beam and the second air passage beam.

17. A pressure relief valve comprising:
    a housing including an air passage chamber defining an airflow passage, wherein the housing further comprises a first air passage beam and a second air passage beam, wherein the air airflow passage is defined at least in part between the first air passage beam and the second air passage beam;
    a membrane flap secured within the air passage chamber, wherein the membrane flap covers the airflow passage in a closed position, and wherein a portion of the membrane flap is configured to move off the airflow passage into an open position; and
    a flap motion dampener proximate to the airflow passage, wherein the flap motion dampener is configured to engage the membrane flap before the membrane flap engages the first and second air passage beams when the membrane flap moves toward the closed position in order to dampen noise, wherein the flap motion dampener connects to the first air passage beam and the second air passage beam, wherein the flap motion dampener spans across the airflow passage, wherein the flap motion dampener comprises a cross rib having a first end that connects to a second end through a main body, wherein the cross rib extends outwardly away from the first and second ends towards and into a crown at a mid-section of the main body, wherein the first end connects to the first air passage beam, wherein the second end connects to the second air passage beam, wherein the first air passage beam is parallel to the second air passage beam, wherein the cross rib is perpendicular to the first air passage beam and the second air passage beam, and wherein the flap motion dampener has a portion proximate to a center of the airflow passage.

18. A pressure relief valve comprising:

a housing including an air passage chamber defining an airflow passage, wherein the airflow passage is defined between a first air passage beam and a second air passage beam, and the first and second air passage beams extend at least partially through the air passage chamber;

a membrane flap secured within the air passage chamber, wherein the membrane flap covers the airflow passage in a closed position, and wherein a portion of the membrane flap is configured to move off the airflow passage into an open position; and a flap motion dampener proximate to the airflow passage, at least a portion of the flap motion dampener extending outwardly in a downstream direction beyond an edge of the first air passage beam, wherein the flap motion dampener is configured to engage the membrane flap before the membrane flap engages the second air passage beam when the membrane flap moves toward the closed position in order to dampen noise.

* * * * *